(12) United States Patent
Cai et al.

(10) Patent No.: US 11,017,552 B2
(45) Date of Patent: May 25, 2021

(54) MEASUREMENT METHOD AND APPARATUS

(71) Applicant: HANGZHOU HIKVISION DIGITAL TECHNOLOGY CO., LTD., Zhejiang (CN)

(72) Inventors: Xiaowang Cai, Zhejiang (CN); Fei Xiao, Zhejiang (CN); Hai Yu, Zhejiang (CN); Meng Fan, Zhejiang (CN)

(73) Assignee: HANGZHOU HIKVISION DIGITAL TECHNOLOGY CO., LTD, Hangzhou (CN)

( * ) Notice: Subject to any disclaimer, the term of this patent is extended or adjusted under 35 U.S.C. 154(b) by 183 days.

(21) Appl. No.: 16/323,472

(22) PCT Filed: May 31, 2017

(86) PCT No.: PCT/CN2017/086592
§ 371 (c)(1),
(2) Date: Feb. 5, 2019

(87) PCT Pub. No.: WO2018/032860
PCT Pub. Date: Feb. 22, 2018

(65) Prior Publication Data
US 2019/0172214 A1 Jun. 6, 2019

(30) Foreign Application Priority Data
Aug. 15, 2016 (CN) .......................... 201610669751.1

(51) Int. Cl.
*G06T 7/70* (2017.01)
*G01C 3/12* (2006.01)
*G06T 7/50* (2017.01)

(52) U.S. Cl.
CPC .................. *G06T 7/70* (2017.01); *G01C 3/12* (2013.01); *G06T 7/50* (2017.01)

(58) Field of Classification Search
None
See application file for complete search history.

(56) References Cited

U.S. PATENT DOCUMENTS

| 2004/0054473 A1 | 3/2004 | Shimomura |
| 2007/0154068 A1* | 7/2007 | Stein .................... G01B 11/026 382/106 |

(Continued)

FOREIGN PATENT DOCUMENTS

| CN | 101074876 A | 11/2007 |
| CN | 100388760 | 5/2008 |

(Continued)

OTHER PUBLICATIONS

Jüngel et al.,"Improving Vision-Based Distance Measurements Using Reference Objects", RoboCop 2007, LNAI 5001, 2008, pp. 89-100.

*Primary Examiner* — Justin P. Misleh
(74) *Attorney, Agent, or Firm* — Blank Rome LLP (57) ABSTRACT

A measurement method and apparatus are provided. The measurement method is applicable to an image acquisition device, and includes: acquiring image data to generate an image data file (S101); capturing an object to be measured in an image corresponding to the image data file (S102); obtaining a first distance between a horizontal line going through a lowest point of the object to be measured in the image and a horizontal line going through a center point of the image (S103); and calculating a second distance between the object to be measured and the image acquisition device based on the first distance, an installation height of the image acquisition device and a pitch angle of the image acquisition device (S104). Compared with the relevant art, the image acquisition device can measure the distance to an object to be measured while achieving relatively low production cost and easy installation. As a result, actual demands can be better satisfied.

17 Claims, 4 Drawing Sheets

(56) References Cited

U.S. PATENT DOCUMENTS

| | | |
|---|---|---|
| 2008/0030711 A1 | 2/2008 | Iizuka |
| 2011/0135157 A1* | 6/2011 | Cho .......................... G06T 7/73 |
| | | 382/106 |
| 2014/0152810 A1 | 6/2014 | Bae |
| 2017/0294132 A1* | 10/2017 | Colmenares .......... G08G 5/045 |

FOREIGN PATENT DOCUMENTS

| | | |
|---|---|---|
| CN | 101881613 A | 11/2010 |
| CN | 103852068 A | 6/2014 |
| CN | 203813888 | 9/2014 |
| CN | 104236462 | 12/2014 |
| CN | 104792302 A | 7/2015 |
| CN | 104899554 A | 9/2015 |
| CN | 105488454 A | 4/2016 |
| CN | 106153000 A | 11/2016 |
| CN | 106443650 A | 2/2017 |
| JP | 2006261995 A | 9/2006 |

\* cited by examiner

MEASUREMENT METHOD AND APPARATUS

This application is a U.S. national stage application based on International Application No. PCT/CN2017/086592 filed May 31, 2017, which claims priority to Chinese Patent Application No. 201610669751.1, filed Aug. 15, 2016, both of which are herein incorporated by reference in their entirety.

TECHNICAL FIELD

The present disclosure relates to the field of video monitoring, and particularly to a measurement method and apparatus.

BACKGROUND

With the rapid development of science and technology, more demands are placed on the functionality of an image acquisition device, such as a camera. For example, an image acquisition device capable of automatically identifying a distance to a captured object is desired. For the purpose above, approaches have been proposed in the relevant art. A Chinese patent application CN100388760 entitled "Ranging Digital Camera" proposes a camera having a laser ranging device installed thereon, through which a distance is measured. A Chinese patent application CN203 813 8.88 entitled "A Vehicle Ranging Module with Dual Cameras" proposes to shoot by a stereo camera, such that a distance can be measured, by stereoscopic vision technology, through the stereo camera.

However, the two approaches both bear some deficiencies in distance measuring. For the former, the requirement of a laser emitting device and a laser receiving device in the camera may increase the production cost of a camera. For the latter, the installation of a stereo camera may be troublesome due to a typically large volume thereof.

Therefore, how to enable an image acquisition device to measure a distance while achieving lower production cost and easy installation is an urgent problem to be solved.

SUMMARY

Embodiments of the present disclosure provide a measurement method and apparatus, to enable an image acquisition device to measure a distance while ensuring the lower production cost and easy installation of the image acquisition device.

An embodiment of the present application provides a measurement method applicable to an image acquisition device. The method includes:

acquiring image data to generate an image data file;

capturing an object to be measured in an image corresponding to the image data file;

obtaining a first distance between a horizontal line going through a lowest point of the object to be measured in the image and a horizontal line going through a center point of the image; and calculating a second distance between the object to be measured and the image acquisition device based on the first distance, an installation height of the image acquisition device and a pitch angle of the image acquisition device.

In one implementation of the embodiment of the present application, calculating a second distance between the object to be measured and the image acquisition device based on the first distance, an installation height of the image acquisition device and a pitch angle of the image acquisition device includes:

calculating a third distance between a first target point and a center point of an imaging plane according to the first distance, wherein the first target point is on the imaging plane of an optical lens of the image acquisition device and corresponds to the lowest point;

calculating an angle between a first line and the ground according to the third distance and the pitch angle of the image acquisition device, wherein the first line goes through a physical position of the lowest point and an optical center of the optical lens; and calculating the second distance between the object to be measured and the image acquisition device according to the angle between the first line and the ground, and the installation height of the image acquisition device.

In one implementation of the embodiment of the present application, after capturing an object to be measured in an image corresponding to the image data file, the method further includes:

obtaining a fourth distance between a horizontal line going through a highest point of the object to be measured in the image and the horizontal line going through the center point of the image; and after calculating the second distance between the object to be measured and the image acquisition device, the method further includes:

calculating a height of the object to be measured based on the second distance, the fourth distance, the installation height of the image acquisition device, and the pitch angle of the image acquisition device.

In one implementation of the embodiment of the present application, calculating a height of the object to be measured based on the second distance, the fourth distance, the installation height of the image acquisition device, and the pitch angle of the image acquisition device includes:

calculating a fifth distance between a second target point and a center point of an imaging plane according to the fourth distance, wherein the second target point is on the imaging plane of an optical lens of the image acquisition device and corresponds to the highest point;

calculating an angle between a third line and the ground according to the fifth distance and the pitch angle of the image acquisition device, wherein the third line goes through a physical position of the highest point and an optical center of the optical lens; and calculating the height of the object to be measured according to the angle between the third line and the ground, the installation height of the image acquisition device, and the second distance.

In one implementation of the embodiment of the present application, obtaining a fourth distance between a horizontal line going through a highest point of the object to be measured in the image and the horizontal line going through the center point of the image includes:

enclosing the object to be measured with a target rectangle, the target rectangle having a pair of sides parallel to the horizontal line going through the center point of the image, and being a rectangle with a minimum area among rectangles that can enclose the object to be measured; and taking a distance between a side of the pair of sides that is farther from the ground and the horizontal line going through the center point of the image as the fourth distance.

In one specific implementation of the embodiment of the present application, before capturing an object to be measured in an image corresponding to the image data file, the method further includes:

processing the image data file to change a bit width of the image data file to a set bit width.

In one implementation of the embodiment of the present application, calculating a height of the object to be measured based on the second distance, the fourth distance, the installation height of the image acquisition device, and the pitch angle of the image acquisition device includes:

detecting whether the pitch angle of the image acquisition device changes;

if the pitch angle of the image acquisition device changes, correcting the pitch angle of the image acquisition device; and calculating the height of the object to be measured based on the second distance, the fourth distance, the installation height of the image acquisition device, and the corrected pitch angle of the image acquisition device.

In one implementation of the embodiment of the present application, obtaining a first distance between a horizontal line going through the lowest point of the object to be measured in the image and a horizontal line going through a center point of the image includes:

enclosing the object to be measured with a target rectangle, the target rectangle having a pair of sides parallel to the horizontal line going through the center point of the image and being a rectangle with a minimum area among rectangles that can enclose the object to be measured; and taking a distance between a side of the pair of sides that is closer to the ground and the horizontal line going through the center point of the image as the first distance.

In one implementation of the embodiment of the present application, calculating a second distance between the object to be measured and the image acquisition device based on the first distance, an installation height of the image acquisition device and a pitch angle of the image acquisition device includes:

detecting whether the pitch angle of the image acquisition device changes;

if the pitch angle of the image acquisition device changes, correcting the pitch angle of the image acquisition device; and calculating the second distance between the object to be measured and the image acquisition device based on the first distance, the installation height of the image acquisition device, and the corrected pitch angle of the image acquisition device.

An embodiment of the present disclosure provides a measurement apparatus applicable to an image acquisition device. The apparatus includes:

an image acquisition module configured for acquiring image data to generate an image data file;

an image processing module configured for capturing an object to be measured in an image corresponding to the image data file;

a first measurement module configured for obtaining a first distance between a horizontal line going through a lowest point of the object to be measured in the image and a horizontal line going through a center point of the image; and a second measurement module configured for calculating a second distance between the object to be measured and the image acquisition device based on the first distance, an installation height of the image acquisition device and a pitch angle of the image acquisition device.

In one implementation of the embodiment of the present application, the second measurement module includes:

a first calculating unit configured for calculating a third distance between a first target point and a center point of an imaging plane according to the first distance, wherein the first target point is on the imaging plane of an optical lens of the image acquisition device and corresponds to the lowest point;

a second calculating unit configured for calculating an angle between a first line and the ground according to the third distance and the pitch angle of the image acquisition device, wherein the first line goes through a physical position of the lowest point and an optical center of the optical lens; and a third calculating unit configured for calculating the second distance between the object to be measured and the image acquisition device according to the angle between the first line and the ground, and the installation height of the image acquisition device.

In one implementation of the embodiment of the present application, the apparatus further includes:

a third measurement module configured for obtaining, after the object to be measured in the image corresponding to the image data file is captured, a fourth distance between a horizontal line going through a highest point of the object to be measured in the image and the horizontal line going through the center point of the image; and a fourth measurement module configured for calculating, after the second distance between the object to be measured and the image acquisition device is calculated, a height of the object to be measured based on the second distance, the fourth distance, the installation height of the image acquisition device, and the pitch angle of the image acquisition device.

In one implementation of the embodiment of the present application, the fourth measurement module includes:

a fourth calculating unit configured for calculating a fifth distance between a second target point and a center point of an imaging plane according to the fourth distance, wherein the second target point is on the imaging plane of an optical lens of the image acquisition device and corresponds to the highest point;

a fifth calculating unit configured for calculating an angle between a third line and the ground according to the fifth distance and the pitch angle of the image acquisition device, wherein the third line goes through a physical position of the highest point and an optical center of the optical lens; and a sixth calculating unit configured for calculating the height of the object to be measured according to the angle between the third line and the ground, the installation height of the image acquisition device, and the second distance.

In one implementation of the embodiment of the present application, the third measurement module includes:

a first to-be-measured object processing unit configured for enclosing the object to be measured with a target rectangle, the target rectangle having a pair of sides parallel to the horizontal line going through the center point of the image, and being a rectangle with a minimum area among rectangles that can enclose the object to be measured; and a first distance determining unit configured for taking a distance between a side of the pair of sides that is farther from the ground and the horizontal line going through the center point of the image as the fourth distance.

In one implementation of the embodiment of the present application, the apparatus further includes:

a bit width change module configured for processing, before the object to be measured in the image corresponding to the image data file is captured, the image data file, so as to change a bit with of the image data file to a set bit width.

In one implementation of the embodiment of the present application, the fourth measurement module includes:

a first pitch angle detecting unit configured for detecting, before the height of the object to be measured is calculated, whether the pitch angle of the image acquisition device changes;

a first pitch angle correcting unit configured for correcting the pitch angle of the image acquisition device when the pitch angle of the image acquisition device changes; and a height calculating unit configured for calculating the height of the object to be measured based on the second distance, the fourth distance, the installation height of the image acquisition device, and the corrected pitch angle of the image acquisition device.

In one implementation of the embodiment of the present application, the first measurement module includes:

a second to-be-measured object processing unit configured for enclosing the object to be measured with a target rectangle, the target rectangle having a pair of sides parallel to the horizontal line going through the center point of the image and being a rectangle with a minimum area among rectangles that can enclose the object to be measured; and a second distance determining unit configured for taking a distance between a side of the pair of sides that is closer to the ground and the horizontal line going through the center point of the image as the first distance.

In one implementation of the embodiment of the present application, the second measurement module includes:

a second pitch angle detecting unit configured for detecting, before the second distance between the object to be measured and the image acquisition device is calculated, whether the pitch angle of the image acquisition device changes;

a second pitch angle correcting unit configured for correcting the pitch angle of the image acquisition device when the pitch angle of the image acquisition device changes; and a distance calculating unit configured for calculating the second distance between the object to be measured and the image acquisition device based on the first distance, the installation height of the image acquisition device, and the corrected pitch angle of the image acquisition device.

In one implementation of the embodiment of the present application, the apparatus further includes:

an alarm module configured for outputting an alarm signal when the second distance is smaller than a preset distance threshold.

In one implementation of the embodiment of the present application, the apparatus further includes:

a display module configured for displaying, in the image, the second distance and the height of the object to be measured.

An embodiment of the present disclosure provides a storage medium for storing an executable program code which, when executed, performs the measurement method described above.

An embodiment of the present disclosure provides an application program which performs, when executed, the measurement method described above.

An embodiment of the present disclosure provides an image acquisition device, including:

a processor, a memory, a communication interface and a bus, wherein the processor, the memory and the communication interface connect and communicate with each other via the bus;

the memory is configured for storing an executable program code;

the processor is configured for executing a program corresponding to the executable program code by reading the executable program code stored in the memory, so as to perform the operations including:

acquiring image data to generate an image data file;

capturing an object to be measured in an image corresponding to the image data file;

obtaining a first distance between a horizontal line going through a lowest point of the object to be measured in the image and a horizontal line going through a center point of the image; and calculating a second distance between the object to be measured and the image acquisition device based on the first distance, an installation height of the image acquisition device and a pitch angle of the image acquisition device.

Embodiments of the present disclosure provide a measurement method and apparatus. The method is applicable to the image acquisition device. The method includes: acquiring image data to generate an image data file; capturing an object to be measured in an image corresponding to the image data file; obtaining a first distance between a horizontal line going through a lowest point of the object to be measured in the image and a horizontal line going through a center point of the image; and calculating a second distance between the object to be measured and the image acquisition device based on the first distance, an installation height of the image acquisition device and a pitch angle of the image acquisition device. Unlike the relevant art where the laser ranging technology or stereoscopic vision technology is utilized for distance measurement, an image acquisition device according to the embodiment measures a distance based on the first distance, the installation height of the image acquisition device, and the pitch angle of the image acquisition device. Therefore, instead of disposing a laser emitting device, a laser receiving device and the like in the image acquisition device, only a minor adjustment on the software and hardware in the image acquisition device is required to enable the image acquisition device to perform the operations described above. Accordingly, the image acquisition device may have a less volume than a stereoscopic computer. Therefore, the image acquisition device can measure the distance to an object to be measured while achieving relatively low production cost and easy installation. As a result, actual demands can be better satisfied.

BRIEF DESCRIPTION OF THE DRAWINGS

The features and advantages of the present disclosure will be more clearly understood with reference to accompanying drawings. The drawings are intended to be exemplary and should not be construed as limiting the present disclosure. In the drawings.

DETAILED DESCRIPTION

To simplify the operations of unfolding a folder with a higher efficiency and better user experience, embodiments of the present application provide a method and apparatus for unfolding a folder.

Technical solutions in the embodiments of the present application are clearly and completely described below with reference to the accompanying drawings in the embodiments of the present application. Obviously, the described embodiments are merely a part of, but not all, the embodiments of the present application. All other embodiments obtained without creative efforts in view of the embodiments of the present application by those skilled in the art fall within the scope of the present application.

To solve the problems existing in relevant art, embodiments of the present application provide a measurement method and apparatus.

An introduction to the measurement method according to an embodiment of the present disclosure is first provided below.

It should be noted that the measurement method provided by the embodiment of the present disclosure can be applied to an image acquisition device. In a practical application, the image acquisition device may be a camera, such as a monocular camera. Of course, the image acquisition device may also be other types of devices capable of acquiring images. Specific types of the image acquisition device are not limited in embodiments of the present application.

Figure 1:
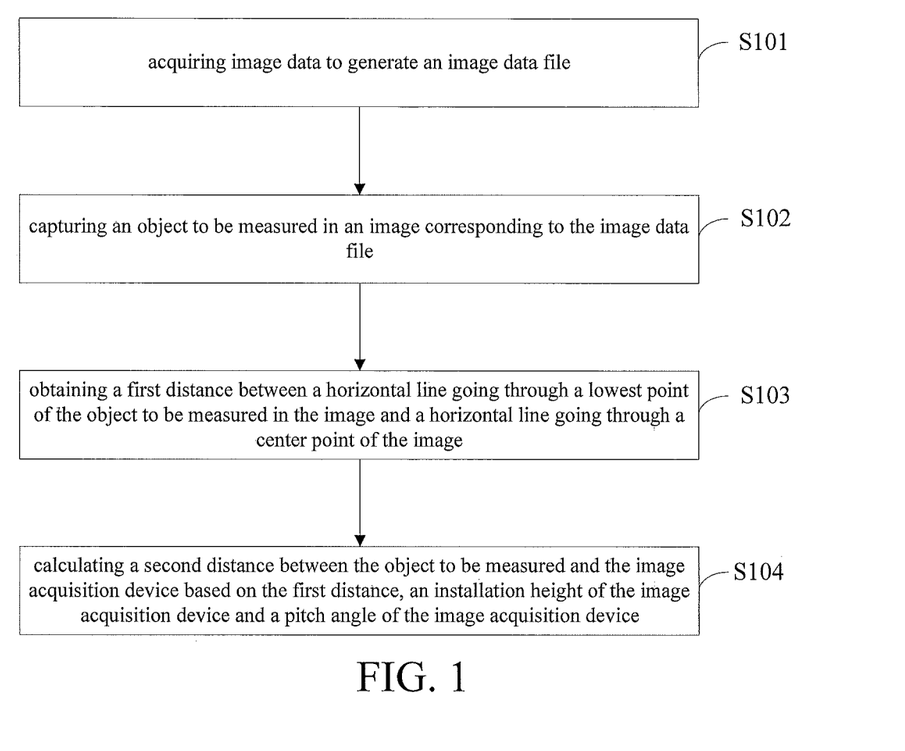
FIG. 1 is a flow chart of a measurement method provided by an embodiment of the present application.

Referring to FIG. 1, a flow chart of a measurement method according to an embodiment of the present application is illustrated. As shown in FIG. 1, the measurement method may include the following operations.

At S101, image data is acquired to generate an image data file.

An image acquisition device may acquire an optical signal for a scene being shot, and then convert the acquired optical signal into an image signal. The image signal may constitute image data. The electronic device may then generate an image data file according to the image data.

At S102, an object to be measured in an image corresponding to the image data file is captured.

Specifically, the object to be measured may be a pedestrian, a vehicle, or the like. Of course, the types of the object to be measured are not limited thereto and may be determined according to actual conditions. The embodiment is not limited in this aspect.

In the present embodiment, specifically, the object to be measured in an image corresponding to the image data file may be captured through a Histogram of Oriented Gradient (HOG) and Support Vector Machine (SVM) method.

It should be appreciated that, HOG is a feature descriptor used in computer vision and image processing for object detection. In the technique, a gradient-orientation histogram for a localized portion of an image is calculated and obtained to serve as a feature. SVM is a supervised learning model in the field of machine learning and is typically used for pattern recognition, classification, and regression analysis.

Specifically, the HOG and SVM method may include the following operations:

A. Sample build: a set of positive samples and negative samples of image is built, which meets the requirements of a HOG descriptor.

B. Feature extraction: a batch of features is extracted from the built set of positive samples and negative samples using a HOG descriptor, so as to build a set of feature samples.

C. SVM model: an SVM model with a penalty-like factor is built.

D. Classifier training: a supervised training is performed on the SVM using the set of feature samples.

E. Target detection: target detection is performed on a sequence of videos using a HOG description-based target detection method.

After the application of the HOG and SVM method described above, the object to be measured in the image corresponding to the image data file can be finally captured.

It should be appreciated that, implementations for the capture of an object to be measured in the image corresponding to the image data file are not limited thereto, but may also be implemented in other manners, the details of which are omitted in this embodiment.

At S103, a first distance between a horizontal line going through a lowest point of the object to be measured in the image and a horizontal line going through a center point of the image is obtained.

Figure 2:
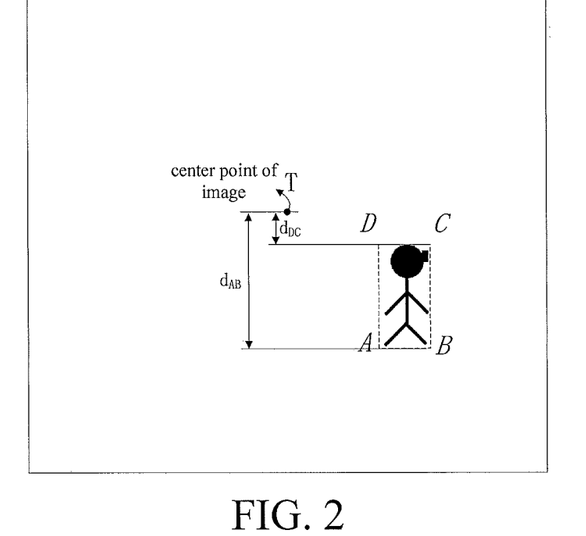
FIG. 2 is a schematic illustrating a displayed image on a display screen.

As shown in FIG. 2, assuming that the lowest point of the object to be measured in the image is point A or point B (points A and B are on the same horizontal line), the horizontal line going through the lowest point of the object to be measured in the image is the straight line where a line segment AB lies. A center point of the image is point T. Accordingly, the first distance is the vertical distance between the point T and the line segment AB, denoted as $d_{AB}$.

It is noted that the first distance between the horizontal line going through the lowest point of the object to be measured in the image and the horizontal line going through the center point of the image may be obtained in various ways. For a clear layout, this will be described later by way of example.

At S104, a second distance between the object to be measured and the image acquisition device is calculated based on the first distance, an installation height of the image acquisition device and a pitch angle of the image acquisition device.

Figure 4:
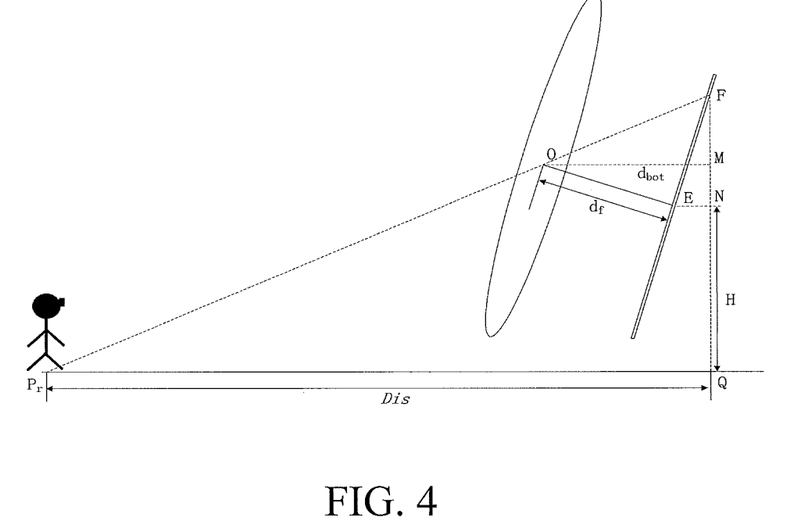
FIG. 4 is a schematic diagram of a photo shooting by an image acquisition device.
Figure 5:
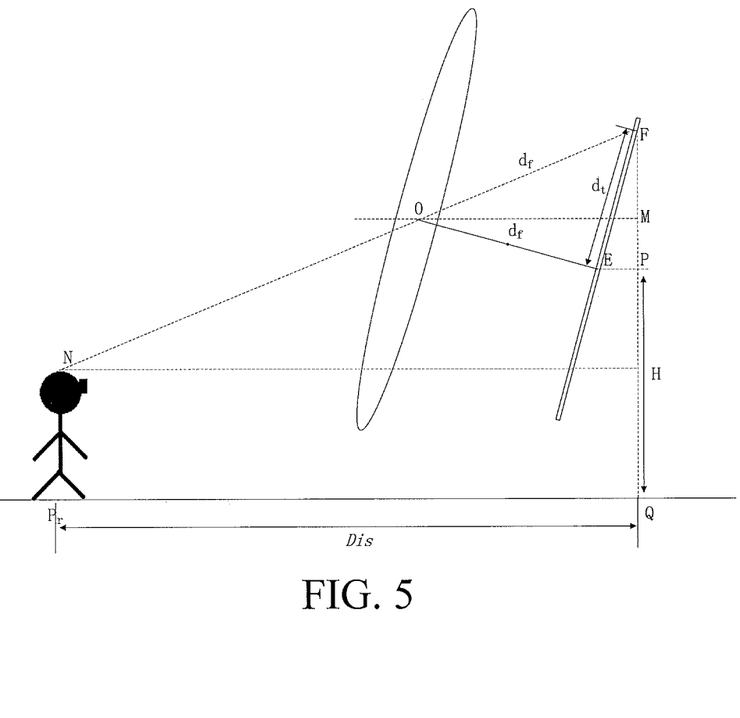
FIG. 5 is another schematic diagram of a photo shooting by an image acquisition device.

It should be noted that the installation height of the image acquisition device refers to a distance between a center point of an imaging plane of an optical lens of the image acquisition device and the ground, denoted as H in FIG. 4 and FIG. 5. The pitch angle of the image acquisition device refers to an angle between a line that goes through the optical center of the optical lens in the image acquisition device and the center point of the imaging plane, and the ground. The pitch angle is denoted as $\angle EOM$ in FIG. 4 and FIG. 5.

Figure 3:
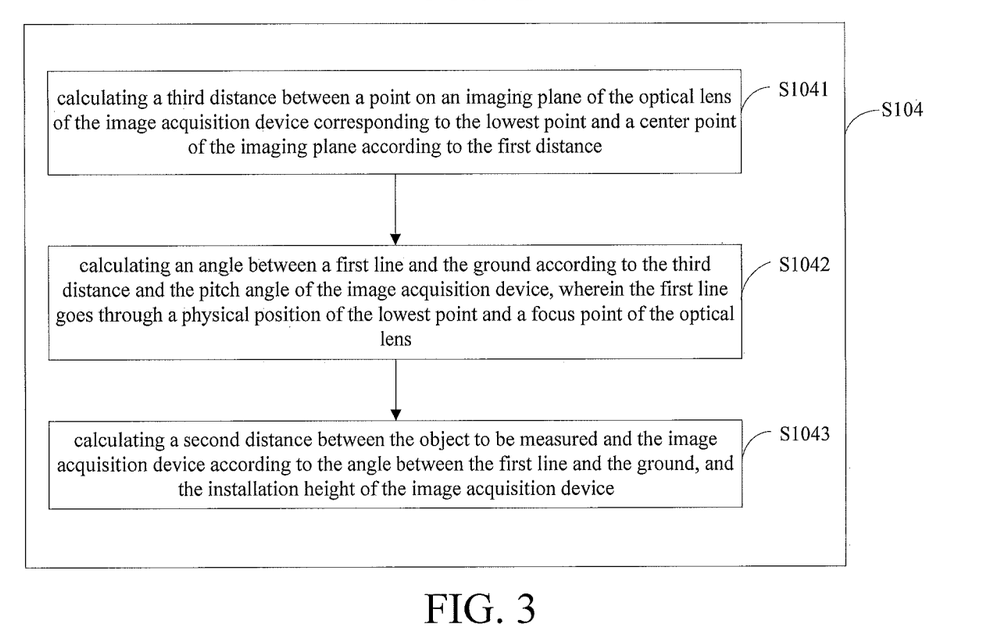
FIG. 3 is a flow chart showing the details of S104 in FIG. 1.

In an implementation of the embodiment of the present application, the operation S104, i.e., calculating a second distance between the object to be measured and the image acquisition device based on the first distance, an installation height of the image acquisition device and a pitch of the image acquisition device may include the following operations as shown in FIG. 3.

At S1041, a third distance between a first target point and a center point of the imaging plane is calculated according to the first distance, wherein the first target point is on the imaging plane of the optical lens of the image acquisition device and corresponds to the lowest point.

Specifically, the third distance may be calculated according to the first distance through the following formula:

$$d_{bot} = \frac{d_{AB}}{H_{im}} \cdot H_{sensor}$$

where $d_{bot}$ is the third distance, $d_{AB}$ is the first distance, $H_{im}$ is a height resolution of the image, and $H_{sensor}$ is the height of the imaging plane.

At S1042, an angle between a first line and the ground is calculated according to the third distance and the pitch angle of the image acquisition device, wherein the first line goes through a physical position of the lowest point and the optical center of the optical lens.

Specifically, the angle between the first line and the ground may be calculated according to the third distance and the pitch of the image acquisition device through the following formula:

$$\tan(\angle EOF) = \frac{d_{bot}}{d_f} \text{ and } \beta = \angle EOF - \angle EOM = \arctan\left(\frac{d_{bot}}{d_f}\right) - \alpha$$

where $\angle EOF$ is the angle between the first line and a second line. The first line goes through a physical position of the lowest point and the optical center of the optical lens. The second line goes through the optical center of the optical lens and the center point of the imaging plane, $d_{bot}$ is the third distance, $d_f$ is a focal length of the optical lens, $\beta$ is the angle between the first line and the ground, and $\angle EOM$ and $\alpha$ are the pitch angle of the image acquisition device.

At S1043, the second distance between the object to be measured and the image acquisition device is calculated according to the angle between the first line and the ground, and the installation height of the image acquisition device.

Specifically, the second distance may be calculated according to the angle between the first line and the ground, and the installation height of the image acquisition device through the following formula:

$$Dis = \frac{H}{\tan\beta}$$

where Dis is the second distance, H is the installation height of the image acquisition device, and $\beta$ is the angle between the first line and the ground.

The principle behind the calculation of the second distance is now described below with reference to FIG. 4.

As shown in FIG. 4, point $P_r$ represents the physical position of the lowest point of the object to be measured, point O is the optical center of the optical lens, point E is the center point of the imaging plane, OE is perpendicular to the imaging plane, and point F (at which the line where $P_rO$ lies intersects the imaging plane) is on the imaging plane and corresponds to the lowest point. The ground is denoted by a horizontal line where $P_rQ$ lies, and FQ is perpendicular to the ground.

The following formulas can be easily derived from the geometrical relationship in FIG. 4:

$$Dis = \frac{FQ}{\tan\beta}, \beta = \angle EOF - \angle EOM = \arctan\left(\frac{d_{bot}}{d_f}\right) - \alpha$$

In general, FN in FIG. 4 has a length much less than NQ (i.e., the installation height H of the image acquisition device). As such, FQ may be assumed to be approximately equal to H. Accordingly, $$Dis = \frac{H}{\tan\beta}.$$

In the present embodiment, H, $d_{bot}$, $d_f$ and $\alpha$ are required to obtain Dis, wherein H, $d_f$ and $\alpha$ may be pre-stored data. Specifically, $d_f$ can be easily determined so long as the specification of the optical lens is determined. The value of $d_f$ may be pre-stored by the user in the image acquisition device. Regarding H and $\alpha$, after installing the image acquisition device, the user may use a length measuring tool such as a graduated scale to obtain H, use an angle measuring tool such as a protractor to obtain $\alpha$, and then pre-store the obtained H and $\alpha$ in the image acquisition device. As such, when the second distance is to be calculated, the image acquisition device may obtain values of the parameters H, $d_f$ and $\alpha$ pre-stored therein. As for $d_{bot}$, it cannot be pre-stored, but it can be determined according to the following formula:

$$d_{bot} = \frac{d_{AB}}{H_{im}} \cdot H_{sensor}$$

Wherein, similar to the parameters H, $d_f$ and $\alpha$, $H_{im}$ and $H_{sensor}$ may also be pre-stored in the image acquisition device.

As such, after the first distance $d_{AB}$ is obtained, the image acquisition device may obtain $d_{bot}$. Next, the image acquisition device may obtain $\beta$ according to the obtained $d_{bot}$. Next, the image acquisition device may easily obtain Dis according to the geometrical relationship between $\beta$, H and Dis.

As shown, in the manner described above, the second distance may be easily obtained by the image acquisition device with little computation. Accordingly, the image acquisition device can obtain the second distance in a very short period of time. As such, actual demands may be better satisfied.

It should be appreciated that, the calculation of the second distance between the object to be measured and the image acquisition based on the first distance, the installation height of the image acquisition device and the pitch angle of the image acquisition device is not limited to the above implementation, but may be implemented according to actual needs. The embodiment is not limited in this aspect.

It is readily apparent that, in this embodiment, after obtaining an image data file, the image acquisition device captures an object to be measured in the image, and obtains a first distance between a horizontal line going through the lowest point of the object to be measured in the image and a horizontal line going through the center point of the image. Then a second distance between the object to be measured and the image acquisition device can be calculated based on the first distance, the installation height of the image acquisition device and the pitch of the image acquisition device.

Unlike the relevant art where the laser ranging technology or stereoscopic vision technology is utilized for distance measurement, an image acquisition device according to the embodiment measures a distance based on the first distance, the installation height of the image acquisition device and the pitch angle of the image acquisition device. Therefore, instead of disposing laser emitting and receiving devices and the like in the image acquisition device, only a minor adjustment on the software and hardware in the image acquisition device is required to enable the image acquisition device to perform the operations S101-S104. Accordingly, the image acquisition device may have a less volume than a stereoscopic computer. Therefore, the image acquisition device can measure the distance to an object to be measured while achieving relatively low production cost and easy installation. As a result, actual demands can be better satisfied.

In an implementation of the embodiment of the present application, after the object to be measured in the image corresponding to the image data file is captured, the method may further include:

obtaining a fourth distance between a horizontal line going through a highest point of the object to be measured in the image and the horizontal line going through the center point of the image.

Accordingly, after the second distance between the object to be measured and the image acquisition device is calculated, the method may further include:

calculating a height of the object to be measured based on the second distance, the fourth distance, the installation height of the image acquisition device and the pitch angle of the image acquisition device.

The height of the object to be measured is a distance between the highest point of the object to be measured in the physical scene and the ground, i.e., a vertical distance between point N and P,Q in FIG. 5.

It should be noted that, the calculation of the height of the object to be measured based on the second distance, the fourth distance, the installation height of the image acquisition device, and the pitch angle of the image acquisition device may be implemented in various manners, examples of which are provided below.

In this embodiment, the calculation of the height of the object to be measured based on the second distance, the fourth distance, the installation height of the image acquisition device, and the pitch of the image acquisition device may include the following operations.

A fifth distance between a second target point and the center point of the imaging plane is calculated according to the fourth distance, wherein the second target point is on the imaging plane of the optical lens of the image acquisition device and corresponds to the highest point.

Specifically, the fifth distance may be calculated according to the fourth distance through the following formula:

$$d_{top} = \frac{d_{DC}}{H_{im}} \cdot H_{sensor}$$

where $d_{top}$ is the fifth distance, $d_{DC}$ is the fourth distance, $H_{im}$ is a height resolution of the image, and $H_{sensor}$ is a height of the imaging plane.

An angle between a third line and the ground is calculated according to the fifth distance and the pitch angle of the image acquisition device, wherein the third line goes through a physical position of the highest point and the optical center of the optical lens.

Specifically, the angle between the third line and the ground may be calculated according to the fifth distance and the pitch angle of the image acquisition device through the following formula:

$$\tan(\angle EOF) = \frac{d_{top}}{d_f} \text{ and } \beta = \angle EON - \angle EOM = \arctan\left(\frac{d_{top}}{d_f}\right) - \alpha$$

where $\angle EOF$ is an angle between the third line and a fourth line. The third line goes through a physical position of the highest point and the optical center of the optical lens. The fourth line goes through the optical center of the optical lens and the center point of the imaging plane; $d_{top}$ is the fifth distance; $d_f$ is a focal length of the optical lens; $\beta$ is the angle between the third line and the ground; and $\angle EOM$ and $\alpha$ represent the pitch angle of the image acquisition device.

The height of the object to be measured is calculated according to the angle between the third line and the ground, the installation height of the image acquisition device, and the second distance.

Specifically, the height of the object to be measured may be calculated according to the angle between the third line and the ground, and the second distance through the following formula:

$$h = H - Dis \cdot \tan \beta$$

where h is the height of the object to be measured, H is the installation height of the image acquisition device, Dis is the second distance, and $\beta$ is the angle between the third line and the ground.

The principle behind the calculation of the height of the object to be measured will be described below with reference to FIG. 5.

As shown in FIG. 5, point N represents a physical position of the highest point of the object to be measured, point O is the optical center of the optical lens, point E is the center point of the imaging plane, OE is perpendicular to the imaging plane, and point F (at which the line in which NO lies intersects the imaging plane) is on the imaging plane and corresponds to the highest point. The ground is represented by a horizontal line where P,Q lies, and FQ is perpendicular to the ground.

The following formula may be easily derived from the geometric relationship in FIG. 5:

$$h = FQ - Dis \cdot \tan\beta, \ \beta = \angle EOF - \angle EOM = \arctan\left(\frac{d_{top}}{d_f}\right) - \alpha$$

In general, in FIG. 5, FP has a length much less than PQ (i.e., the installation height H of the image acquisition device). FQ may be thus considered to be approximately equal to H. Accordingly, $h = H - Dis \cdot \tan \beta$.

In the present embodiment, H, Dis, $d_{top}$, $d_f$ and $\alpha$ are required to obtain h, wherein H, $d_f$ and $\alpha$ may all be pre-stored data. Specifically, $d_f$ can be easily determined so long as the specification of the optical lens is determined. The value of $d_f$ may be pre-stored by a user in the image acquisition device. Regarding H and $\alpha$, after installing the image acquisition device, the user may use a length measuring tool such as a graduated scale to obtain H, use an angle measuring tool such as a protractor to obtain $\alpha$, and then pre-store the obtained H and $\alpha$ in the image acquisition device. As such, when a height of the object to be measured is to be calculated, the image acquisition device may obtain values of parameters H, $d_f$, $\alpha$ and the like pre-stored therein. Dis may be obtained according to the first distance through a predefined distance calculation formula. As for $d_{top}$, it cannot be pre-stored, but it can be determined according to the following formula:

$$d_{top} \frac{d_{DC}}{H_{im}} \cdot H_{sensor}$$

where, like the parameters H, $d_f$, α and the like, $H_{im}$ and $H_{sensor}$ may also be pre-stored in the image acquisition device.

As such, after obtaining the fourth distance $d_{DC}$, the image acquisition device may obtain $d_{top}$. Next, the image acquisition device may obtain β according to $d_{top}$. Next, the image acquisition device may easily obtain h according to the geometrical relationship between h, β, H and Dis.

It can be seen that, a height of an object to be measured may be easily obtained with little computation by the image acquisition device in the manner described above. Accordingly, the image acquisition device can obtain the height of the object to be measured in a very short period of time. As such, actual demands can be better satisfied.

In one implementation of the embodiment of the present application, the obtaining of a fourth distance between a horizontal line going through the highest point of the object to be measured in the image and the horizontal line going through the center point of the image may include:

enclosing the object to be measured with a target rectangle, which has a pair of sides parallel to a horizontal line going through the center of the image, wherein the target rectangle is a rectangle with a minimum area among rectangles that can enclose the object to be measured;

taking a distance between a side of the pair of sides that is farther from the ground and the horizontal line going through the center point of the image as the fourth distance.

As shown in FIG. 2, after acquiring image data and generating an image data file, the image acquisition device may display an image corresponding to the image data file in a display screen. Subsequently, the image acquisition device may capture an object to be measured in the image, such as the pedestrian shown in FIG. 2. Once the pedestrian is captured, the image acquisition device may enclose the object to be measured with a target rectangle ABCD. The target rectangle ABCD has a side AB and a side CD that are parallel to a horizontal line going through the center point T of the image. As can be readily seen, the point at which the side CD intersects the outer contour of the pedestrian is the highest point of the object to be measured in the image. As such, the distance between the side CD and the horizontal line going through the center point T of the image is taken as the fourth distance.

It can be seen that the fourth distance can be conveniently obtained in the above manner.

In one implementation of the embodiment of the present disclosure, the obtaining of the first distance between the horizontal line going through the lowest point of the object to be measured in the image and the horizontal line going through the center point of the image may include:

enclosing the object to be measured with a target rectangle, which has a pair of sides parallel to the horizontal line going through the center point of the image, wherein the target rectangle is a rectangle with a minimum area among rectangles that can enclose the object;

taking the distance between a side of the pair of sides that is closer to the ground and the horizontal line going through the center point of the image as the first distance.

As shown in FIG. 2, after acquiring image data and generating an image data file, the image acquisition device may display an image corresponding to the image data file in a display screen. Subsequently, the image acquisition device may capture an object to be measured in the image, such as the pedestrian shown in FIG. 2. Once the pedestrian is captured, the image acquisition device may enclose the object to be measured with a target rectangle ABCD. The target rectangle ABCD has a side AB and a side CD that are parallel to a horizontal line going through the center point T of the image. As can be readily seen, the point at which the side AB intersects the outer contour of the pedestrian is the lowest point of the object to be measured in the image. As such, the distance between the side AB and the horizontal line going the center point T of the image is taken as the first distance.

It can be seen that the first distance can be conveniently obtained in the above manner.

In one implementation of the embodiment of the present disclosure, before the object to be measured in the image corresponding to the image data file is captured, the method may further include:

processing the image data file to change a bit width of the image data file to a set bit width.

It is noted that the set bit width can ensure a normal display of an image corresponding to the image data file on the display screen. The preset bit width is, for example, 8 bits.

As can be readily seen, to determine the first distance and the fourth distance with a target rectangle, the image acquisition device has to display the image corresponding to the image data file in the display screen. In the embodiment, an image data file directly acquired by the image acquisition device typically has a high bit width, for example, 12 bits or 14 bits. However, the display screen has some restrictions to a bit width of an image data file corresponding to an image to be displayed thereon. That is, the display screen requires an image file having a preset bit width (e.g., 8 bits). In the embodiment, before capturing the object to be measured in the image corresponding to the image data file, the image acquisition device may process the image data file to change the bit width of the image data file to a preset bit width. In this way, the image corresponding to the image data file can be successfully displayed on the display screen so as to facilitate the subsequent steps.

It can be seen that, in the embodiment, a normal display of an image corresponding to the image data file on the display screen can be ensured. This facilitates the performance of the subsequent operations to obtain the second distance and the height of the object to be measured.

It may be appreciated that, in some cases, the image acquisition device may be installed on a moving object such as a vehicle. Specifically, the image acquisition device may be installed at the front of the vehicle. When the front wheel of the vehicle goes past a pit on the ground, the pitch angle of the image acquisition device installed at the front of the vehicle changes. At this time, the image acquisition device will fail to obtain an accurate height of an object to be measured with a preset pitch angle. In order to solve the problem, in this embodiment, the calculation of the height of the object to be measured based on the second distance, the fourth distance, the installation height and the pitch angle of the image acquisition device may include:

detecting whether the pitch angle of the image acquisition device changes;

if so, correcting the pitch angle of the image acquisition device;

calculating the height of the object to be measured based on the second distance, the fourth distance, the installation height of the image acquisition device, and the corrected pitch angle of the image acquisition device.

In this embodiment, an electronic compass can be installed on the image acquisition device, through which the amount of change in the pitch angle of the vehicle can be measured. Assuming that the image acquisition device has a pre-stored pitch angle ∠EOM, and the electronic compass measures and obtains a pitch angle change of γ, then the actual pitch angle of the image acquisition device is a difference between the ∠EOM and γ. In actual calculation of the height of the object to be measured, the pitch angle of the image acquisition device may be corrected. For example, the difference between ∠EOM and γ is used as the actual pitch angle for the calculation of the height.

It can be seen that, in the embodiment, a relatively accurate height of the object to be measured can be obtained by correcting the pitch angle of the image acquisition device.

Similarly, in this embodiment, the calculation of the second distance between the object to be measured and the image acquisition device based on the first distance, the installation height of the image acquisition device, and the pitch of the image acquisition device includes:

detecting whether the pitch angle of the image acquisition device changes;

if so, correcting the pitch angle of the image acquisition device; and calculating the second distance between the object to be measured and the image acquisition device based on the first distance, the installation height of the image acquisition device, and the corrected pitch angle of the image acquisition device.

The detail of the correction on the pitch angle by the image acquisition device can be known with reference to the correction process in the calculation of the height of the object to be measured, and thus is omitted here.

It can be seen that, in the embodiment, a relatively accurate second distance can be obtained by correcting the pitch angle of the image acquisition device.

In summary, the image acquisition device in the embodiment of the present disclosure can measure a distance to an object to be measured while achieving relatively low production cost and easy installation. As such, actual needs can be better satisfied.

Figure 6:
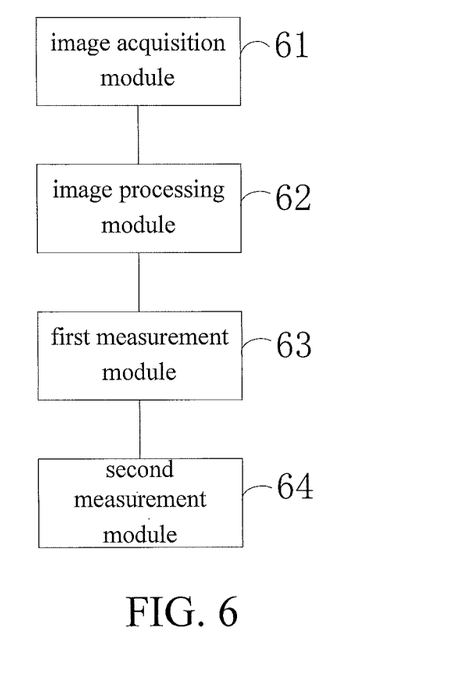
FIG. 6 is a block diagram of a measurement apparatus provided by an embodiment of the present disclosure.

In correspondence with the above method embodiment, an embodiment of the present disclosure provides a measurement apparatus. FIG. 6 illustrates a block diagram of a measurement apparatus according to an embodiment of the present disclosure. The apparatus as shown in FIG. 6 is applicable to an image acquisition device. The apparatus may include an image acquisition module 61, an image processing module 62, a first measurement module 63, and a second measurement module 64.

The image acquisition module 61 is configured for acquiring image data to generate an image data file.

The image processing module 62 is configured for capturing an object to be measured in an image corresponding to the image data file.

The first measurement module 63 is configured for obtaining a first distance between a horizontal line going through a lowest point of the object to be measured in the image and a horizontal line going through a center point of the image.

The second measurement module 64 is configured for calculating a second distance between the object to be measured and the image acquisition device based on the first distance, an installation height of the image acquisition device and a pitch angle of the image acquisition device.

Unlike the relevant art where laser ranging technology or stereoscopic vision technology is utilized for distance measurement, an image acquisition device according to the embodiment measures a distance based on the first distance, the installation height of the image acquisition device, and the pitch angle of the image acquisition device. Therefore, instead of disposing a laser emitting device, a laser receiving device and the like in the image acquisition device, only a minor adjustment on the software and hardware in the image acquisition device is required. Accordingly, the image acquisition device may have a less volume than a stereoscopic computer. Therefore, the image acquisition device can measure the distance to an object to be measured while achieving relatively low production cost and easy installation. As a result, actual demands can be better satisfied.

In one implementation of the embodiment of the present application, the second measurement module may include:

a first calculating unit configured for calculating a third distance between a first target point and a center point of an imaging plane according to the first distance, wherein the first target point is on the imaging plane of an optical lens of the image acquisition device and corresponds to the lowest point;

a second calculating unit configured for calculating an angle between a first line and the ground according to the third distance and the pitch angle of the image acquisition device, wherein the first line goes through a physical position of the lowest point and an optical center of the optical lens; and a third calculating unit configured for calculating the second distance between the object to be measured and the image acquisition device according to the angle between the first line and the ground, and the installation height of the image acquisition device.

In one implementation of the embodiment of the present application, the apparatus may further include:

a third measurement module configured for obtaining, after the object to be measured in the image corresponding to the image data file is captured, a fourth distance between a horizontal line going through a highest point of the object to be measured in the image and the horizontal line going through the center point of the image; and a fourth measurement module configured for calculating, after the second distance between the object to be measured and the image acquisition device is calculated, a height of the object to be measured based on the second distance, the fourth distance, the installation height of the image acquisition device, and the pitch angle of the image acquisition device.

In one implementation of the embodiment of the present application, the fourth measurement module may include:

a fourth calculating unit configured for calculating a fifth distance between a second target point and a center point of an imaging plane according to the fourth distance, wherein the second target point is on the imaging plane of an optical lens of the image acquisition device and corresponds to the highest point;

a fifth calculating unit configured for calculating an angle between a third line and the ground according to the fifth distance and the pitch angle of the image acquisition device, wherein the third line goes through a physical position of the highest point and an optical center of the optical lens; and a sixth calculating unit configured for calculating the height of the object to be measured according to the angle between the third line and the ground, the installation height of the image acquisition device, and the second distance.

In one implementation of the embodiment of the present application, the third measurement module may include:

a first to-be-measured object processing unit configured for enclosing the object to be measured with a target rectangle, the target rectangle having a pair of sides parallel to the horizontal line going through the center point of the image, and being a rectangle with a minimum area among rectangles that can enclose the object to be measured; and a first distance determining unit configured for taking a distance between a side of the pair of sides that is farther from the ground and the horizontal line going through the center point of the image as the fourth distance.

In one implementation of the embodiment of the present application, the apparatus may further include:

a bit width change module configured for processing, before the object to be measured in the image corresponding to the image data file is captured, the image data file, so as to change a bit with of the image data file to a set bit width.

In one implementation of the embodiment of the present application, the fourth measurement module may include:

a first pitch angle detecting unit configured for detecting, before the height of the object to be measured is calculated, whether the pitch angle of the image acquisition device changes;

a first pitch angle correcting unit configured for correcting the pitch angle of the image acquisition device when the pitch angle of the image acquisition device changes; and a height calculating unit configured for calculating the height of the object to be measured based on the second distance, the fourth distance, the installation height of the image acquisition device, and the corrected pitch angle of the image acquisition device.

In one implementation of the embodiment of the present application, the first measurement module may include:

a second to-be-measured object processing unit configured for enclosing the object to be measured with a target rectangle, the target rectangle having a pair of sides parallel to the horizontal line going through the center point of the image and being a rectangle with a minimum area among rectangles that can enclose the object to be measured; and a second distance determining unit configured for taking a distance between a side of the pair of sides that is closer to the ground and the horizontal line going through the center point of the image as the first distance.

In one implementation of the embodiment of the present application, the second measurement module may include:

a second pitch angle detecting unit configured for detecting, before the second distance between the object to be measured and the image acquisition device is calculated, whether the pitch angle of the image acquisition device changes;

a second pitch angle correcting unit configured for correcting the pitch angle of the image acquisition device when the pitch angle of the image acquisition device changes; and a distance calculating unit configured for calculating the second distance between the object to be measured and the image acquisition device based on the first distance, the installation height of the image acquisition device, and the corrected pitch angle of the image acquisition device.

In one implementation of the embodiment of the present application, the apparatus may further include:

an alarm module configured for outputting an alarm signal when the second distance is smaller than a preset distance threshold.

In the embodiment, the image acquisition device may be installed on a vehicle. When the second distance is smaller than the preset distance threshold, which indicates that the vehicle on which the image acquisition device is installed is very close to an object to be measured, for example, another vehicle or a pedestrian on the road, the image acquisition may issue an alarm signal, for example, an acoustical signal.

A passenger on the vehicle may be aware of the situation in time and make a proper response. As such, the security of the vehicle and pedestrian may be guaranteed.

In one implementation of the embodiment of the present application, the apparatus may further include:

a display module configured for displaying, in the image, the second distance and the height of the object to be measured.

In the embodiment, the height and distance information of an object to be measured may be obtained by the user intuitively and conveniently through contents displayed in the image. The user may thus have a better experience.

To conclude, the image acquisition device in the embodiment can measure the distance to an object to be measured while achieving relatively low production cost and easy installation. As a result, actual demands can be better satisfied.

A storage medium provided by an embodiment of the present disclosure is described below.

The embodiment of the present application provides a storage medium for storing an executable program code which, when executed, performs the measurement method described above.

The image acquisition device in the embodiment can measure the distance to an object to be measured while achieving relatively low production cost and easy installation. As a result, actual demands can be better satisfied.

An application program provided by an embodiment of the present disclosure is described below.

The embodiment of the present application provides an application program which performs, when executed, the measurement method described above.

The image acquisition device in the embodiment can measure the distance to an object to be measured while achieving relatively low production cost and easy installation. As a result, actual demands can be better satisfied.

An image acquisition device provided by an embodiment of the present disclosure is described below.

The embodiment of the present disclosure provides an image acquisition device, including:

a processor, a memory, a communication interface and a bus, wherein the processor, the memory and the communication interface connect and communicate with each other via the bus;

the memory is configured for storing an executable program code;

the processor is configured for executing a program corresponding to the executable program code by reading the executable program code stored in the memory, so as to perform the operations comprising:

acquiring image data to generate an image data file;

capturing an object to be measured in an image corresponding to the image data file;

obtaining a first distance between a horizontal line going through a lowest point of the object to be measured in the image and a horizontal line going through a center point of the image; and calculating a second distance between the object to be measured and the image acquisition device based on the first distance, an installation height of the image acquisition device and a pitch angle of the image acquisition device.

The image acquisition device in the embodiment can measure the distance to an object to be measured while achieving relatively low production cost and easy installation. As a result, actual demands can be better satisfied.

It should be noted that the relationship terms used here, such as "first", "second", and the like are only used to distinguish one entity or operation from another entity or operation, but do not necessarily require or imply that there is actual relationship or order between these entities or operations. Moreover, the terms "include", "comprise", or any variants thereof are intended to cover a non-exclusive inclusion, such that processes, methods, articles, or devices, including a series of elements, include not only those elements that have been listed, but also other elements that have not specifically been listed or the elements intrinsic to these processes, methods, articles, or devices. Without further limitations, elements limited by the wording "include(s) a/an . . . ", "comprise(s) a/an . . . " do not exclude additional identical elements in the processes, methods, articles, or devices, including the listed elements.

All of the embodiments in the description are described in a correlated manner, and identical or similar parts in various embodiments can refer to one another. In addition, the description for each embodiment focuses on the differences from other embodiments. In particular, the embodiment of the apparatus is described briefly, since it is substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

What is claimed is:

1. A measurement method, applicable to an image acquisition device, comprising:
    acquiring image data to generate an image data file;
    capturing an object to be measured in an image corresponding to the image data file;
    obtaining a first distance between a horizontal line going through a lowest point of the object to be measured in the image and a horizontal line going through a center point of the image; and
    calculating a second distance between the object to be measured and the image acquisition device based on the first distance, an installation height of the image acquisition device and a pitch angle of the image acquisition device,
    wherein, obtaining the first distance between the horizontal line going through the lowest point of the object to be measured in the image and the horizontal line going through the center point of the image comprises:
    enclosing the object to be measured with a target rectangle, the target rectangle having a pair of sides parallel to the horizontal line going through the center point of the image and being a rectangle with a minimum area among rectangles that can enclose the object to be measured; and
    taking a distance between a side of the pair of sides that is closer to the ground and the horizontal line going through the center point of the image as the first distance.

2. The method according to claim 1, wherein, calculating a second distance between the object to be measured and the image acquisition device based on the first distance, an installation height of the image acquisition device and a pitch angle of the image acquisition device comprises:
    calculating a third distance between a first target point and a center point of an imaging plane according to the first distance, wherein the first target point is on the imaging plane of an optical lens of the image acquisition device and corresponds to the lowest point;
    calculating an angle between a first line and the ground according to the third distance and the pitch angle of the image acquisition device, wherein the first line goes through a physical position of the lowest point and an optical center of the optical lens; and
    calculating the second distance between the object to be measured and the image acquisition device according to the angle between the first line and the ground, and the installation height of the image acquisition device.

3. The method according to claim 1, wherein, after capturing an object to be measured in an image corresponding to the image data file, the method further comprises:
    obtaining a fourth distance between a horizontal line going through a highest point of the object to be measured in the image and the horizontal line going through the center point of the image; and
    after calculating the second distance between the object to be measured and the image acquisition device, the method further comprises:
    calculating a height of the object to be measured based on the second distance, the fourth distance, the installation height of the image acquisition device, and the pitch angle of the image acquisition device.

4. The method according to claim 3, wherein, calculating a height of the object to be measured based on the second distance, the fourth distance, the installation height of the image acquisition device, and the pitch angle of the image acquisition device comprises:
    calculating a fifth distance between a second target point and a center point of an imaging plane according to the fourth distance, wherein the second target point is on the imaging plane of an optical lens of the image acquisition device and corresponds to the highest point;
    calculating an angle between a third line and the ground according to the fifth distance and the pitch angle of the image acquisition device, wherein the third line goes through a physical position of the highest point and an optical center of the optical lens; and
    calculating the height of the object to be measured according to the angle between the third line and the ground, the installation height of the image acquisition device, and the second distance.

5. The method according to claim 3, wherein, obtaining a fourth distance between a horizontal line going through a highest point of the object to be measured in the image and the horizontal line going through the center point of the image comprises:
    enclosing the object to be measured with a target rectangle, the target rectangle having a pair of sides parallel to the horizontal line going through the center point of the image, and being a rectangle with a minimum area among rectangles that can enclose the object to be measured; and
    taking a distance between a side of the pair of sides that is farther from the ground and the horizontal line going through the center point of the image as the fourth distance.

6. The method according to claim 5, wherein, before capturing an object to be measured in an image corresponding to the image data file, the method further comprises:
    processing the image data file to change a bit width of the image data file to a set bit width.

7. The method according to claim 3, wherein, calculating a height of the object to be measured based on the second distance, the fourth distance, the installation height of the image acquisition device, and the pitch angle of the image acquisition device comprises:

detecting whether the pitch angle of the image acquisition device changes;

if the pitch angle of the image acquisition device changes, correcting the pitch angle of the image acquisition device; and     calculating the height of the object to be measured based on the second distance, the fourth distance, the installation height of the image acquisition device, and the corrected pitch angle of the image acquisition device.

8. The method according to claim 1, wherein, calculating a second distance between the object to be measured and the image acquisition device based on the first distance, an installation height of the image acquisition device and a pitch angle of the image acquisition device comprises:

detecting whether the pitch angle of the image acquisition device changes;

if the pitch angle of the image acquisition device changes, correcting the pitch angle of the image acquisition device; and     calculating the second distance between the object to be measured and the image acquisition device based on the first distance, the installation height of the image acquisition device, and the corrected pitch angle of the image acquisition device.

9. A non-transitory storage medium for storing an executable program code, which, when executed, performs the measurement method according to claim 1.

10. An image acquisition device, comprising:

a processor, a memory, a communication interface and a bus, wherein     the processor, the memory and the communication interface connect and communicate with each other via the bus;

the memory is configured for storing an executable program code;

the processor is configured for executing a program corresponding to the executable program code by reading the executable program code stored in the memory, so as to perform the operations comprising:

acquiring image data to generate an image data file;

capturing an object to be measured in an image corresponding to the image data file;

obtaining a first distance between a horizontal line going through a lowest point of the object to be measured in the image and a horizontal line going through a center point of the image; and         calculating a second distance between the object to be measured and the image acquisition device based on the first distance, an installation height of the image acquisition device and a pitch angle of the image acquisition device,     wherein, the operation of obtaining the first distance between the horizontal line going through the lowest point of the object to be measured in the image and the horizontal line going through the center point of the image comprises:

enclosing the object to be measured with a target rectangle, the target rectangle having a pair of sides parallel to the horizontal line going through the center point of the image and being a rectangle with a minimum area among rectangles that can enclose the object to be measured; and         taking a distance between a side of the pair of sides that is closer to the ground and the horizontal line going through the center point of the image as the first distance.

11. The image acquisition device according to claim 10, wherein, the processor is caused to perform operations of:

calculating a third distance between a first target point and a center point of an imaging plane according to the first distance, wherein the first target point is on the imaging plane of an optical lens of the image acquisition device and corresponds to the lowest point;

calculating an angle between a first line and the ground according to the third distance and the pitch angle of the image acquisition device, wherein the first line goes through a physical position of the lowest point and an optical center of the optical lens; and     calculating the second distance between the object to be measured and the image acquisition device according to the angle between the first line and the ground, and the installation height of the image acquisition device.

12. The image acquisition device according to claim 10, wherein, after capturing an object to be measured in an image corresponding to the image data file, the processor is caused to perform an operation of:

obtaining a fourth distance between a horizontal line going through a highest point of the object to be measured in the image and the horizontal line going through the center point of the image; and     after calculating the second distance between the object to be measured and the image acquisition device, the processor is caused to perform an operation of:

calculating a height of the object to be measured based on the second distance, the fourth distance, the installation height of the image acquisition device, and the pitch angle of the image acquisition device.

13. The image acquisition device according to claim 12, wherein, the processor is caused to perform operations of:

calculating a fifth distance between a second target point and a center point of an imaging plane according to the fourth distance, wherein the second target point is on the imaging plane of an optical lens of the image acquisition device and corresponds to the highest point;

calculating an angle between a third line and the ground according to the fifth distance and the pitch angle of the image acquisition device, wherein the third line goes through a physical position of the highest point and an optical center of the optical lens; and     calculating the height of the object to be measured according to the angle between the third line and the ground, the installation height of the image acquisition device, and the second distance.

14. The image acquisition device according to claim 12, wherein, the processor is caused to perform operations of:

enclosing the object to be measured with a target rectangle, the target rectangle having a pair of sides parallel to the horizontal line going through the center point of the image, and being a rectangle with a minimum area among rectangles that can enclose the object to be measured; and     taking a distance between a side of the pair of sides that is farther from the ground and the horizontal line going through the center point of the image as the fourth distance.

15. The image acquisition device according to claim 14, wherein, before capturing an object to be measured in an image corresponding to the image data file, the processor is caused to perform an operation of:

processing the image data file to change a bit width of the image data file to a set bit width.

16. The image acquisition device according to claim 12, wherein, the processor is caused to perform operations of:
   detecting whether the pitch angle of the image acquisition device changes;
   if the pitch angle of the image acquisition device changes, correcting the pitch angle of the image acquisition device; and
   calculating the height of the object to be measured based on the second distance, the fourth distance, the installation height of the image acquisition device, and the corrected pitch angle of the image acquisition device.

17. The image acquisition device according to claim 10, wherein, the processor is caused to perform operations of:
   detecting whether the pitch angle of the image acquisition device changes;
   if the pitch angle of the image acquisition device changes, correcting the pitch angle of the image acquisition device; and
   calculating the second distance between the object to be measured and the image acquisition device based on the first distance, the installation height of the image acquisition device, and the corrected pitch angle of the image acquisition device.

* * * * *

UNITED STATES PATENT AND TRADEMARK OFFICE
CERTIFICATE OF CORRECTION

| | |
|---|---|
| PATENT NO. | : 11,017,552 B2 |
| APPLICATION NO. | : 16/323472 |
| DATED | : May 25, 2021 |
| INVENTOR(S) | : Xiaowang Cai et al. |

It is certified that error appears in the above-identified patent and that said Letters Patent is hereby corrected as shown below:

In the Specification

In Column 13, please delete "$[d_{top} \frac{d_{DC}}{H_{im}} \cdot H_{sensor}]$," and add the correct formula, -- $d_{top} = \frac{d_{DC}}{H_{im}} \cdot H_{sensor}$ --.

Signed and Sealed this
Ninth Day of August, 2022

Katherine Kelly Vidal
*Director of the United States Patent and Trademark Office*